Oct. 26, 1948.  N. M. BRYSON  2,452,222
BRIDGE RAMP
Filed Dec. 21, 1946
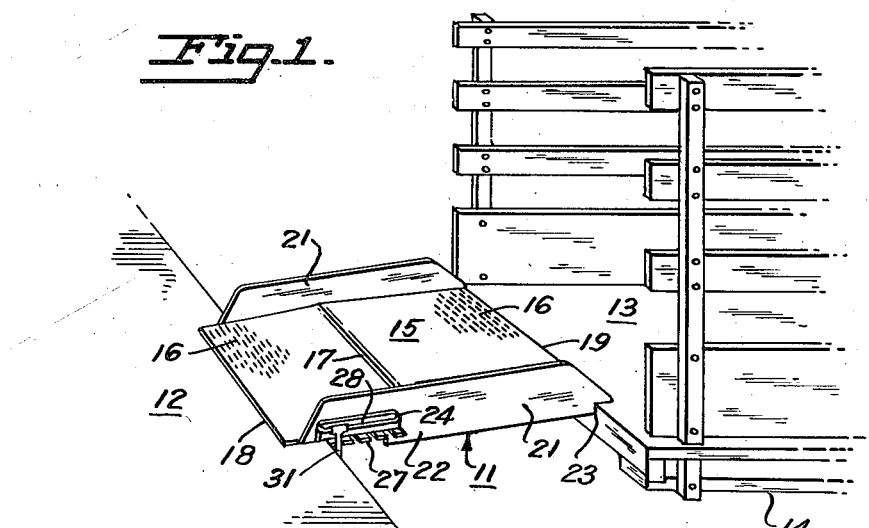
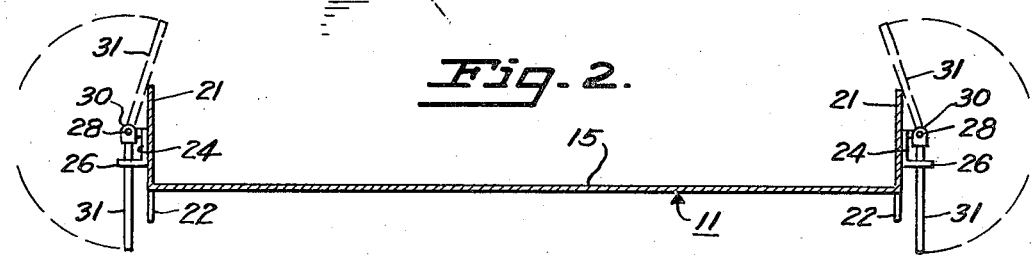
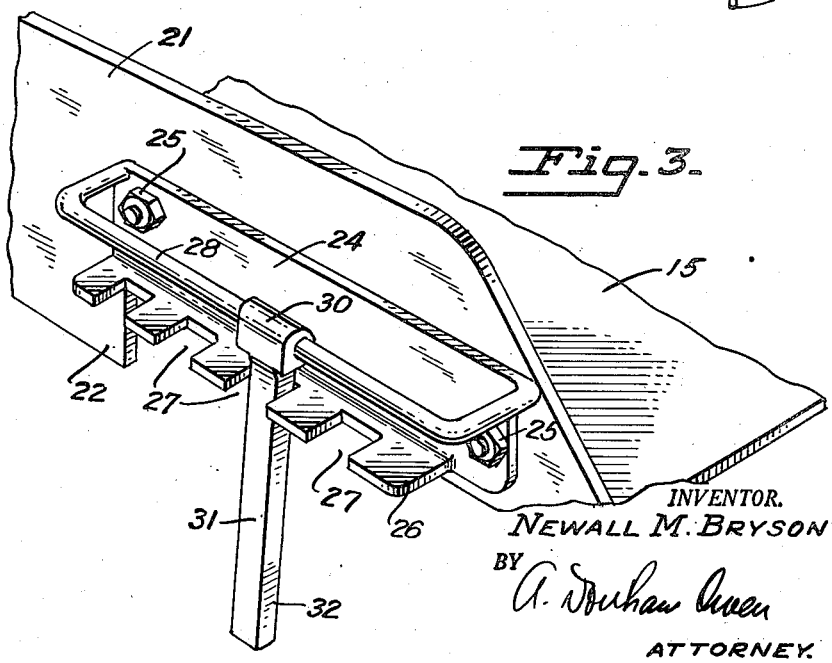
INVENTOR.
NEWALL M. BRYSON
BY
ATTORNEY.

Patented Oct. 26, 1948

2,452,222

UNITED STATES PATENT OFFICE 2,452,222

BRIDGE RAMP

Newall M. Bryson, San Francisco, Calif., assignor to Pallet Engineering Company, San Francisco, Calif., a firm Application December 21, 1946, Serial No. 717,662

2 Claims. (Cl. 14—72)

This invention relates to dock boards and, more particularly, to improved dock boards of the type employed to span the gap between spaced platforms, such, for example, as the floor of a railroad freight car and an adjacent loading dock.

The principal object of the invention is to provide an improved dock board that is adapted to bridge gaps between platforms disposed in many varied relationships.

Another object of the invention is to provide a dock board that may be securely anchored in place in any of a variety of positions with respect to spaced platforms defining a gap to be bridged, whereby maximum loading efficiency may be facilitated in cramped quarters at either or both ends of the dock board.

Another object of the invention is to provide a dock board that satisfies the foregoing objectives and, yet, is simple to manufacture and convenient to use.

Another object of the invention is to provide a dock board that satisfies the foregoing objectives and yet affords a high degree of safety against the usual hazards such as running off one side of the ramp, skidding on the surface thereof, and jarring the dock board into a precarious position when approaching or leaving it incident to travel thereacross.

Another object of the invention is to provide a dock board having an improved mechanism for locking the dock board in position bridging a gap between spaced platforms.

Still further objects and advantages of the invention will become apparent from the following description of a preferred embodiment thereof, taken in conjunction with the accompanying drawings, in which:

Fig. 1 is a perspective view of a dock board bridging the gap between a loading platform and the floor of a vehicle.

Fig. 2 is an end view of the dock board partly in section; and

Fig. 3 is a view in perspective of a portion of the clamping mechanism employed to lock the dock board in the position shown in Fig. 1.

Referring to the drawings, a dock board 11 embodying the present invention is shown in Fig. 1 spanning the gap between a loading dock 12 and the floor 13 of a truck 14.

The structural features of the dock board shown in Fig. 1 and illustrated in greater detail in the other figures of the drawings, include a ramp 15 that is preferably formed of rolled steel plate having its upper surface provided with a large number of small protuberances 16 adapted to impart anti-skid properties thereto. The ramp 15 is bent along a transversely extending line 17 that preferably passes through the center of gravity thereof, so the ramp is bowed slightly upwardly between its ends for insuring that the end edges of the ramp will respectively contact the floor surface of the dock 12 and the floor surface 13 of the truck 14, irrespective of moderate differences in their relative elevations. The amount of bending of the ramp for this purpose should not be so great, however, that too abrupt a rise from either loading surface will be produced. In order to minimize the jar resulting from wheels rolling over the end edges of the ramp, and to reduce the danger that a person walking over the ramp will trip over the end edges thereof, these edges are preferably chamfered at 18 and 19. Reinforcing braces may be welded to the bottom surface of the ramp 15 for increasing its rigidity.

Along its side edges, the ramp 15 is provided with complementary side plates 21 that project upwardly from one end of the ramp nearly to the opposite end thereof and serve as curbs or guide rails to prevent the wheels of a dolly or the like from running over the side edges of the ramp. The side plates 21 also assist in strengthening the ramp 15. Each side plate 21 includes a portion 22 that depends below the ramp 15 for a portion of its length for engaging with its edge or ledge 23 the edge of the floor surface 13 defining one side of the gap to be bridged.

The adjustable dock engaging mechanisms respectively associated with the side plates 21 are identical except for being of opposite hand, and the following description of one of them will be understood to apply to both.

The plate 24, fastened by bolts 25 to the side plate 21, has a projecting portion 26 extending out from its bottom, in which are cut the notches or cut-out portions 27. The pivot rod 28, preferably made integral with the plate 24, runs directly over the center of the notches 27, and supports the collar 30 of the locking bar 31, which has a loose fit so that it can easily slide or rotate on the rod 28. The shank 32 of the bar 31 is slightly smaller in cross-section than the notches 27, and is long enough to extend several inches below the side plate 21.

When the dock board is lowered into a position bridging the gap between two platforms, such as a loading dock 12 and the floor 13 of a truck 14, one end of one or both of the depending portions 22 of the side plates 21 is brought into abutment with the side edge of the platform 13, for example. The dock board is then locked against accidental, horizontal, sliding movement merely by moving each bar 31 longitudinally in a direction to bring their respective shanks 32 into close abutment with the adjacent side edge of the other platform 12. When the two bars 31 are locked in the notches 27, the dock engaging arms 31 are locked against subsequent longitudinal movement in the opposite direction unless they are manually tilted upwardly for this purpose. Two points of contact with the side edge of the platform 12 may always be effected by the two locking bars 31. The dock board will be positively anchored against accidental, longitudinal, sliding movement and against accidental, rotary, sliding movement about its vertical axis when it is jarred by transporting loads over the ramp 15 from one platform to the other.

Because the two dock engaging arms are independently adjustable, the opposite side edges of the two platforms may be disposed out of parallel to a very substantial degree without impairing the effectiveness of the mechanism for locking the dock board in place. Moreover, when it is desired to approach or leave the ramp at a particularly wide horizontal angle, it is possible to anchor the dock board just as firmly in place with its longitudinal center line disposed at a substantial horizontal angle with a normal to either of the opposed side edges of the two platforms.

From the foregoing description of a preferred embodiment of the invention, it will be apparent that I have provided a dock board that is admirably adapted to bridge gaps between platforms disposed in many varied relationships and that may be securely anchored in place while disposed for maximum loading efficiency. It will also be apparent that this has been accomplished by means of a structure that is simple and inexpensive to manufacture and convenient to use under a wide variety of conditions with a high degree of safety against the usual hazards, such as running off one side of the ramp, skidding on the surface thereof, or jarring the dock board out of place when approaching or leaving it.

While I have disclosed a single preferred embodiment of the invention in considerable detail, it is to be understood that this has been done for illustrative purposes and that the invention is not limited to the details disclosed except as required by the appended claims.

I claim:

1. A dock board of the type adapted to bridge a gap between the opposed edges of two adjacent surfaces, said dock board comprising a platform having side plates, portions of which extend below the level of the platform and provide a surface-edge-engaging shoulder at one end thereof; a longitudinal flange extending from one edge of said plates and adjacent the opposite end thereof and having a plurality of notches therealong; a guide member parallel and coextensive with said flange; and a surface-edge-engaging arm slidably and rotatably supported by said guide member, said arm being of a length to extend below said plate when engaging a selected notch in said flange.

2. The dock board of claim 1 in which said guide member is a rod supported by said plate substantially coextensive and parallel with said flange in vertically spaced relation thereto, said arm being slidably and rotatably supported by said rod.

NEWALL M. BRYSON.

REFERENCES CITED

The following references are of record in the file of this patent:

UNITED STATES PATENTS

| Number | Name | Date |
|---|---|---|
| 1,144,836 | Green | June 29, 1915 |
| 1,440,025 | Nicholson | Dec. 26, 1922 |
| 1,628,809 | Sandstrom | May 17, 1927 |
| 1,692,731 | Gunderson | Nov. 20, 1928 |
| 2,329,855 | Rydner | Sept. 21, 1943 |
| 2,424,876 | Butler | July 29, 1947 |